(12) United States Patent
Smith et al.

(10) Patent No.: US 7,552,420 B1
(45) Date of Patent: Jun. 23, 2009

(54) EXTERNALLY DEFINED APPLICATION CONFIGURATION

(75) Inventors: Steven E. Smith, San Jose, CA (US); Gerald B. Huff, Berkeley, CA (US)

(73) Assignee: Intuit Inc., Mountain View, CA (US)

( * ) Notice: Subject to any disclaimer, the term of this patent is extended or adjusted under 35 U.S.C. 154(b) by 543 days.

(21) Appl. No.: 10/932,632

(22) Filed: Sep. 1, 2004

(51) Int. Cl.
  *G06F 9/44* (2006.01)
  *G06F 9/24* (2006.01)
  *G06F 15/16* (2006.01)
(52) U.S. Cl. .......................... 717/121; 713/1; 709/220
(58) Field of Classification Search ................ 717/121; 713/1; 709/220
  See application file for complete search history.

(56) References Cited

U.S. PATENT DOCUMENTS

| | | | | |
|---|---|---|---|---|
| 6,083,276 | A * | 7/2000 | Davidson et al. | ............. 717/107 |
| 6,092,189 | A * | 7/2000 | Fisher et al. | .................... 713/1 |
| 2001/0032207 | A1 * | 10/2001 | Hartley et al. | ................ 707/102 |
| 2002/0103810 | A1 * | 8/2002 | Menachemi et al. | ......... 707/102 |
| 2003/0163472 | A1 * | 8/2003 | Hartley et al. | .................. 707/10 |
| 2003/0167266 | A1 * | 9/2003 | Saldanha et al. | ................ 707/6 |
| 2004/0015476 | A1 * | 1/2004 | Twaddle | ......................... 707/1 |
| 2004/0054569 | A1 * | 3/2004 | Pombo et al. | ................... 705/7 |
| 2004/0199516 | A1 * | 10/2004 | Thames et al. | .............. 707/100 |
| 2005/0091346 | A1 * | 4/2005 | Krishnaswami et al. | ...... 709/220 |

* cited by examiner

*Primary Examiner*—Wei Y Zhen
*Assistant Examiner*—Chih-Ching Chow
(74) *Attorney, Agent, or Firm*—Osha • Liang LLP

(57) ABSTRACT

The present invention provides an improved general-purpose system and method for providing dynamically updateable, context-sensitive configuration information based on the state of the application, external configuration data and a set of rules associated with that data. An application definition repository stores application configuration data and rules for managing the application. An application context manager applies application context data to the rules and evaluates the rules to get a context-based result for the application. The application context manager parses the rules and applies retrieved context data and symbols to the rules to reach a result. In addition, an application configuration engine applies the context-based result of evaluating the rules to provide, to a client, information for configuring the application appropriately based on the application context. The application configuration engine creates and manages one or more application objects that can be given to the client to provide information about the configuration of an application.

29 Claims, 5 Drawing Sheets

EXTERNALLY DEFINED APPLICATION CONFIGURATION

BACKGROUND OF THE INVENTION

1. Field of the Invention

The present invention is related to application configuration, and more particularly to configuration of an application through a centralized source external to the application.

2. Description of the Background Art

Software applications often permit a user to have some control over his/her user experience when using the software application by allowing the user to set a number of user preferences and configure the application to meet the user's specific needs. Such configuration options allow a user to set, for example, the colors and fonts used in the application, what menus appear and what menu items are displayed in each menu, and other similar types of preferences.

While the user has some ability to control application configuration according to the user's preferences, frequently the options available to the user for application configuration are set when compiling the application. The data used to control application configuration is bound at compile time, and thus cannot later be easily revised or updated independently. If the application configuration data is built in as a part of the application itself, rather than being stored externally, it is particularly difficult to update or modify the data. It would be useful to be able to control the user experience and control application configuration based upon the context or state of the application, and thus have the application configuration vary dependent upon the context of the application. For example, it would be useful to be able to control which menus and menu items appear dependent upon the version of the application that is running, the results of a previous menu item selection, information provided to the application, what files are currently open, what access authority a user has, etc. As one example, if the "professional version" of the application is running rather than the "basic version," more menus and menu items associated with this version may appear, which would otherwise not appear in the "basic version." Thus, the application behavior changes based upon the current application context.

Some current applications have "add-ins," in which the presence of a physical file or registry entry makes functionality available dependent on the presence of the file/entry. Some products have in-code mechanisms for checking licenses or registry files and dynamically adjusting the application configuration. However, these do not provide general-purpose control over a large number of different user experiences and application configurations based on context. The decision-making regarding application configuration is not centralized, nor is the data easily updated or able to be updated without restarting the application. It would be useful to have a flexible system that can be used to control the configuration of a number of different applications, and that allows centralized control of large portions of the user experience based on data stored external to the application that is independently updateable.

Accordingly, what is needed is a general-purpose mechanism for dynamically controlling the application configuration via independently updateable external data based on different contexts or states of the application.

SUMMARY OF THE INVENTION

The present invention provides an improved general-purpose system and method for providing dynamically updateable, context-sensitive configuration information based on the state of the application, external configuration data and a set of rules associated with that data. An application definition repository stores application configuration data and rules associated with that data for managing the application configuration. An application context manager applies application context data to the rules and evaluates the rules to get a context-based result for the application. The application context manager parses the rules and applies retrieved context data and symbols to the rules to reach a result.

In addition, an application configuration engine applies the context-based result of evaluating the rules to provide, to a client, information for configuring the application appropriately based on the application context. The application configuration engine creates and manages one or more application objects that can be given to the client to provide information about the definition of an application.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF A PREFERRED EMBODIMENT

The following description of system components and operation is merely exemplary of embodiments of the present invention. One skilled in the art will recognize that the various designs, implementations, and techniques described herein may be used alone or in any combination, and that many modifications and equivalent arrangements can be used. Accordingly, the following description is presented for purposes of illustration, and is not intended to limit the invention to the precise forms disclosed.

Figure 1:
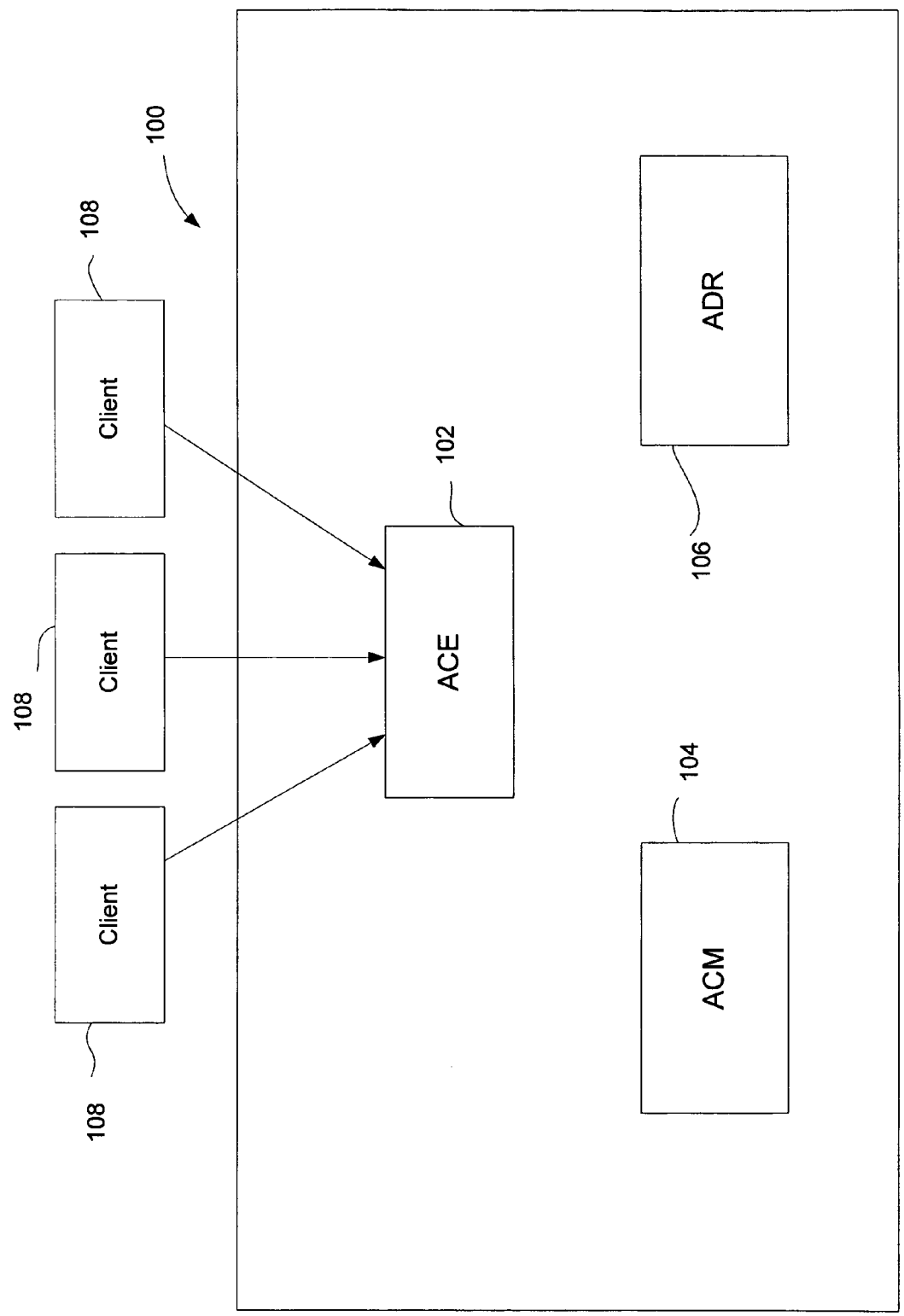
FIG. 1 is a block diagram depicting functional components for practicing the present invention, according to an embodiment of the present invention.

Referring now to FIG. 1, there is shown a block diagram depicting functional components for practicing the present invention, according to one embodiment. As will be apparent to one skilled in the art, the various functional components shown in FIG. 1 may be implemented, for example, as software modules and data storage components in a computer system. However, there may be other implementations and contexts in which the invention may operate. As is known in the art, computer system can be adapted to execute functional components or computer program modules for providing functionality described herein. In this description, computer program modules or functional components refer to computer program logic for providing the specified functionality. A module or functional component can be implemented in hardware, firmware, and/or software. Where any of the modules/components described herein are implemented as software, the module/component can be implemented as a standalone program, but can also be implemented in other ways, for example as part of a larger program, as a plurality of separate programs, or as one or more statically or dynamically linked libraries (DLL). It will be understood that the modules/components described herein represent one embodiment of the present invention. Certain embodiments may include other modules/components. In addition, the embodiments may lack modules/components described herein and/or distribute the described functionality among the modules/components in a different manner. Additionally, the functionalities attributed to more than one module/component can be incorporated into a single module/component.

In the illustrated embodiment of the present invention, the system 100 is shown as including three functional components: an application configuration engine 102, an application context manager 104, and an application definition repository 106. As used herein, the term "application" can refer to software, firmware, embedded systems, a program, a collection of programs, an object or a collection of objects, or other types of computer executable instructions. The present invention is not limited to use by desktop applications to control configurations of the applications, but can also be used for controlling the configuration of a web server such as Apache®, a suite of products such as Microsoft Office®, a database server such as Oracle®, personal digital assistants, personal information management programs, cell phones, user interfaces, hardware firewalls, etc.

The configuration system 100 is adapted to contain specifications that drive the behavior of an application and to expose only those specifications that are appropriate given the current product and context. Examples of application configuration include configuration of the contents of menus, the contents of forms, the features available to each user, report specifications, the names of features/reports/data elements, the number and names of an application's preferences, default preference values, default lists of accounts, inventory items, customer types, etc.

The application configuration engine (ACE) 102 is the primary interface through which the clients 108 access the system 100 or receive data. The clients 108 use the ACE 102 to get the correct configuration of an application and/or present the correct user experience given the current application context. The clients 108 are associated with or have access to the application for configuration, and in some embodiments, the clients 108 themselves embody the application to be configured. Although FIG. 1 shows only three clients 108 accessing the system 100, there can be any number of clients 108. As used herein, the term "client" 108 refers to a recipient of data from the ACE 102. For example, a client 108 can be a shared user interface (UI) component, such as a graphical window, a tree view, a progress meter, a dialog box, a spreadsheet component, a web browser, a media player, etc.

A client 108 can also be business logic, such as a program or application that assembles financial data from the user and performs calculations for preparing tax returns. In some embodiments, the ACE 102 does not act as the primary interface for the clients 108, but instead the clients access the system 100 or receive data through the application context manager 104.

In some embodiments, the ACE 102 is a single component, such as a single DLL that can run on a platform (e.g., a Windows® platform). In other embodiments, the ACE 102 is made up of multiple components, such as a set of UNIX® daemons, Windows® services, and/or location independent common object request broker architecture (CORBA) or distributed component object model (DCOM) services that each provide a portion of the ACE 102 functionality and collectively provide the entire ACE 102 functionality. One of ordinary skill in the art will recognize that the invention can be used in a client-server, middleware layer, or other service model as appropriate.

The ACE 102 provides the client 108 with the correct application definition given the current application context. The ACE 102 manages one or more objects at runtime that represent the application definition, and the ACE 102 returns to the client 108 those objects and values that make sense given the application context. In some embodiments, the object or objects managed by the ACE 102 are C++ objects that determine what application information should be displayed based on the current application context. For example, a C++ object managed by the ACE 102 can calculate the correct set of menu items to be displayed in a menu that are appropriate given the current context of the application. This context includes, for example, the particular application type or version installed, the user service subscription status, the user's preference settings, the user access rights, the application state, the current window state, etc. Thus, if the user has the "professional version" of the application installed, extra menus or menu items may appear to the user that might not appear if the user has installed only the "basic version" of the application. In addition, the names of menu items that appear can vary based on context. For example, the text of a menu item may appear to the user as "Budget Reports" in one version or type of an application, but may appear to the user as "Budget and Forecasting Reports" in another version or type of an application. As another example, a user might input preferences into the application, and these preferences might affect which menus or menus items within the menus appear to that particular user.

As described above, the ACE 102 delivers to the client 108 an object or a set of objects (e.g., menus or menu items) that encapsulate information about the content of each application. This content can include items such as flavors of an application (i.e., a specialization of one or more products, such as Health Care, Contractor, Non-Profit), commands, menus, report lists, report specifications, parameters, toolbar specifications, data objects, data elements, and terminology. There can also be different types of application objects, such as data-related objects that model data, permission-related objects that model the defaults for the roles that users can play in the application and what rights they get for each role, product and flavor-related objects that model the different product levels or versions (e.g. Basic version, Pro version, etc.), flavors (e.g., standard, health care, non-profit, etc.) and product/flavor combinations, access point and command-related objects that model how UI access points are created and displayed in the application, and other various types. As used herein, the term "application object" refers to one of a collection of specific classes representing the various aspects found in the application definition.

The application definition repository (ADR) 106 stores the raw definitions of the application objects (e.g., roles, entitlements, data objects, etc.). Thus, the ADR 106 acts as a repository for the raw application configuration options that are available for an application before rules have been applied to the raw data to determine which application configuration options are appropriate given the current application context. In some embodiments, the ADR 106 acts as a consolidated application definition repository that lists all possible information about the application in one place (e.g., all menus, all possible names for menu items, etc). For example, if there are twenty possible menu items in a "file" menu of an application that might appear in different situations dependent upon current application context, these twenty possible items can be stored in the ADR 106 as raw application definition data.

The ADR 106 also stores rules for transforming the definitions. For example, the rules can be conditional logic, such as "if/then" statements that are context dependent. Within the rules, there may also be conditional logic, such as Boolean expressions or other types of logical expressions. In some embodiments, the rules are embedded in the raw application data stored in the ADR 106. For example, the raw application data might have embedded within it "if/then" statements and/or Boolean expressions that can be used to determine whether or not a particular menu or menu item will appear dependent upon context. In some embodiments, the raw application data plus embedded rules are stored as one or more extensible markup language (XML) files, though the data plus rules can be stored in other formats. For example, the data plus rules could be stored in a database.

In other embodiments, some or all of the rules are external rules that are separate from the definitions (rather than being embedded in the data), and that can be applied to an entire definition or parts of a definition. For example, a raw application definition could be stored as one or more extensible markup language (XML) files, and the rules could be stored in one or more extensible stylesheet language transformation (XSLT) files. In some embodiments, the raw application data can be hashed, encrypted, obfuscated, stored in a binary format, etc. to make it difficult to be modified, read, and/or accessed in an inappropriate manner.

As used herein, the terms "application definition" or "application data" refer to a description of the various configurable aspects of the application (e.g., menu items, toolbars, product/flavors, preferences, etc). One example of an application definition in XML with embedded rules is as follows:

```
<AppDef>
    <Menu ID="REPORTS" Name="Reports">
        <MenuItem ID="BUDGETS" Name="&Budgets" Visible="true">
            <MenuItemIf test="feature.forecasting = 1" Name="&Budgets and Forecasts"/>
        </MenuItem>
        <MenuItem ID="ADVBUDGETS" Name="&Advanced Budgets" Visible="false">
            <MenuItemIf test="product.level >= Pro" Visible="true"/>
        </MenuItem>
        <MenuItem ID="INVREPORTS" Name="&Inventory" Visible="false">
            <MenuItemIf test="prefs.UseInventory = 1" Visible="true"/>
        </MenuItem>
    </Menu>
</AppDef>
```

In this example, the ADR 106 reads this XML and calls the ACE 102 to create C++ objects for the Menu and for the MenuItems. In the first example, when the client 108 asks the menu item for its name (GetName( )), the application object managed by the ACE 102 computes the correct value for the menu item name based on the "if test" of the embedded rule. In the second example, when the client 108 asks the menu item if it is visible (IsVisible( )), the application object managed by the ACE 102 computes the visibility based on the test. The third example depends upon a user preference for inventory reports that has been set. The tests can access the application context from the application context manager 104 to resolve the conditional logic within the rules. For example, the tests might determine what the application version or type is, whether this is the accountant's copy of a file, whether the file is in single user mode, what the user preferences are, etc. In some embodiments, the ACM 104 may resolve the rules and conditional logic to provide a result to the ACE 102. In other embodiments, the ACE 102 may resolve the rules and conditional logic without assistance from the ACM 104.

The application context manager (ACM) 104 evaluates conditional logic (e.g., Boolean expressions, or other types of logical expressions) to help the ACE 102 calculate the correct current application configuration based on the current application context. The ACE 102 uses the ACM 104 to evaluate this logic to determine the current application context so that the ACE 102 can return to the client 108 only the relevant application objects based on various values of runtime state information. The ACM 104 parses and evaluates the conditional logic and retrieves current values for symbols. The ACM 104 then analyzes the conditional logic plus retrieved values and returns a result to the ACE 102. For example, the ACM 104 can answer questions of the form "is (expression) true?" As another example, the ACM 104 might resolve the expression "product.level >= Pro" to determine if the application is the "professional version" or a version that is higher than the "professional version." In some embodiments, the ACM 104 also resolves rules, such as "if/then" expressions to provide a result. In some embodiments, the ACM 104 can also have a caching scheme to reduce reparsing and reevaluating expressions when their variables have not changed. The ACE 102 can notify clients 108 when an expression changes that affects an application object's state.

The ACM 104 also manages the registering of data source objects for the various context data sources throughout the application. The ACM 104 manages a set of objects that expose a context data source interface that can be used to extract the value of a single variable in an expression. These context data sources may include information about the current state or context of the application (e.g., the current version of the application that is running).

Figure 2:
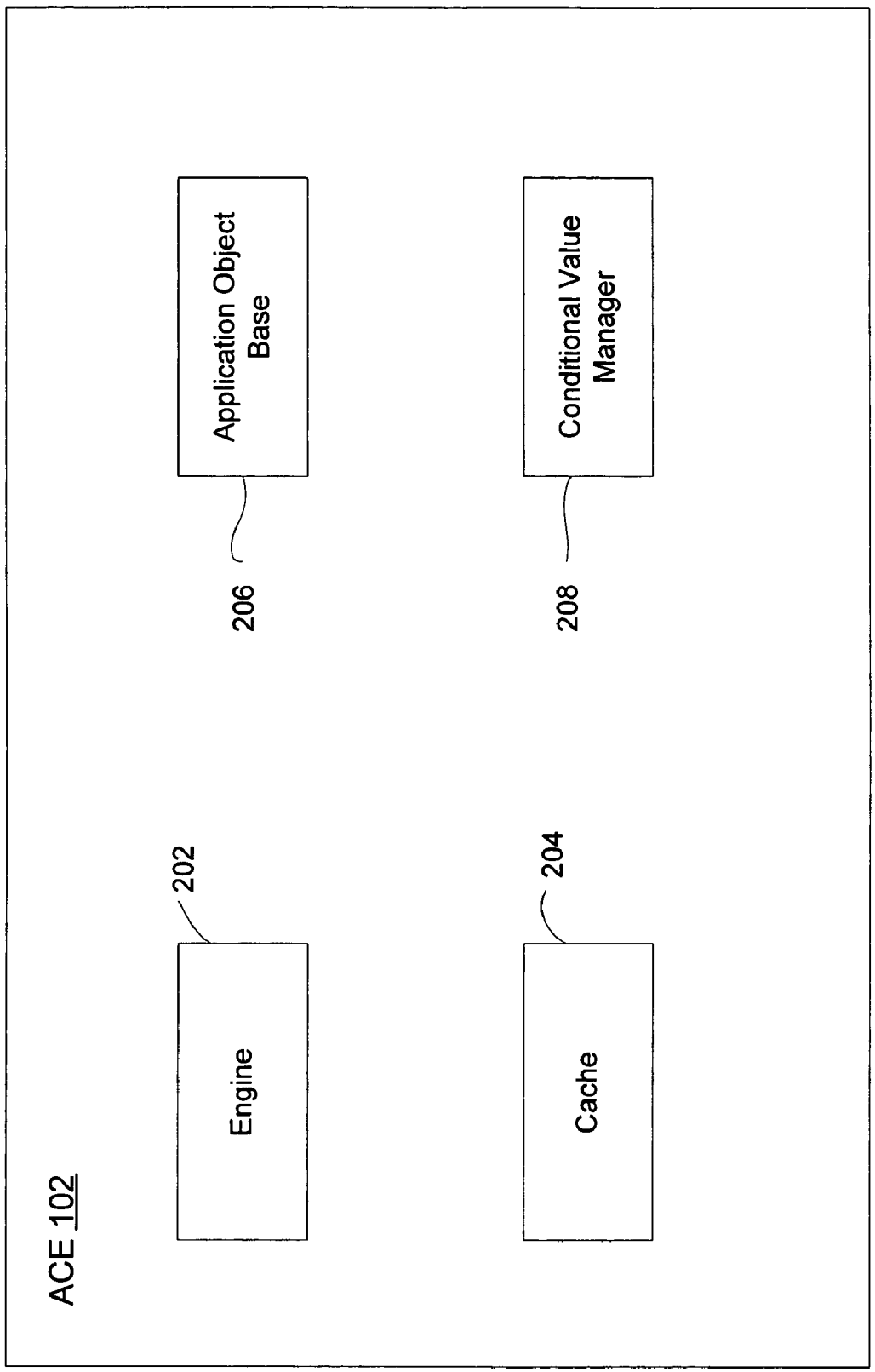
FIG. 2 is a block diagram depicting functional components within the application configuration engine, according to an embodiment of the present invention.

Referring now to FIG. 2, there is shown a block diagram depicting functional components of the ACE 102, according to an embodiment of the present invention. In the illustrated embodiment of the ACE 102, there is shown four components: an engine 202 a cache 204, an application object base 206, and a conditional value manager 208.

The engine 202 manages an in-memory set of objects (e.g., C++ objects) that provide information about the definition of an application. The data for these classes can be obtained from the ADR 106. In some embodiments, the engine 202 is implemented using the factory design pattern. Thus, the engine 202 can be a factory for creating new instances of the C++ objects used by the ACE 102. In some embodiments, the engine 202 keeps track of objects it creates in a set of maps stored in cache 204, in which there is one map per object type. The objects can also each be given unique ID's, and the ACE 102 may have the ability to get the ID of an object, the ability to retrieve an object by its ID, and also the capability to validate the ID's for objects.

In some embodiments of the present invention, the engine 202 of the ACE 102 uses a runtime object registry during startup to get access to the global objects that implement a condition evaluator interface for the ACM 104 and repository interface for the ADR 106. The condition evaluator interface permits communication between the ACE 102 and the ACM 104. The repository interface permits communication between the ACE 102 and the ADR 106. The ACE 102 also registers itself as providing a configuration engine interface, thereby allowing components of the system 100 to locate and communicate with the ACE 102. In some embodiments, the engine 202 also asks the ADR 106 to do an initial load, which may result in a series of calls back to the engine 202 to create a set of C++ objects for the ACE 102. In some embodiments, the engine 202 also loads "conditional aliases" from the ADR 106 into the ACM 104. These aliases, which are discussed in more detail below, allow a named item to represent a longer, more complex Boolean or logical expression. As an alternative to using a runtime object registry, in some embodiments the engine 202 might go to locations defined by a specific URI or URL, or the engine 202 might contact a server or object request broker, such as a CORBA object request broker (ORB).

The application object base 206 is the base class for the C++ objects used by the ACE 102. The application object base 206 provides a common interface and some basic services for these objects, in some embodiments of the present invention. In addition to information that is basic to each object (e.g., its object type, its class name, etc.), the application object base 206 provides access to property information or single named data values, such as "type," "value," "resource id," etc. The application object base 206 also provides relationship information regarding 1:1 or 1:M relationships with other objects (e.g., a role has 0 . . . * entitlements associated with it). The application object base 206 provides standard information retrieval methods that permit retrieval of information about, for example, an object's type, its name, its ID, etc. The objects can also implement a method for setting data into the object by name. In some embodiments, the ACE 102 calls the ADR 106 for either an initial load of raw application definition information, a load of a specific object by type and ID, or a load of all objects of a certain type. The ADR 106 can call back to the ACE 102 to construct an object of type "T" with an ID "X." The ACE 102 uses a prototype object of type "T" to create a new instance with ID "X." The new instance is returned to the ADR 106, which then loads the application definition data into that object.

To facilitate the use of a diverse set of object and object types, the objects and object classes set up by application object base 206 may support a common interface for object construction, data getting and setting, and configuration operations, such as token substitution. In an object-oriented language such as C++ or Java®, for example, this can be achieved by having the objects inherit from a common base class that includes methods such as NewObject( ), SetProperty( ), GetPropertyValueByName( ), DoTokenSubstitution( ), etc.

In some embodiments, the ACE 102 also has the ability to apply aliases, substitute expressions, macros, token expansions, or other approaches known in the art in order to enhance the flexibility of the system 100. For example, text substitution tokens may be embedded in the text in the raw application definition. A token, "% CustomerTerm %," could represent the value "Patient" in some types of applications and "Client" in others. Thus, whenever a request is made for a value, not only will the rules be computed, but the text substitution will also be performed. The value of the token can be provided in dictionaries that could be, for example, provided in the ADR 106, or the value of the token could be stored in another location as appropriate. The dictionary itself can be subject to rules, and thus the dictionary can provide different values according to certain conditions. In some embodiments, the token value can be read or derived from the ACM 104.

The conditional value manager 208 is a "smart" value storage class that is adapted to address the needs of the ACE 102. The application objects in the ACE 102 do not necessarily have just one value for a property. The value may vary based on the application context. For example, the name of a report group might be different based on whether a particular feature is enabled. The conditional value manager 208 can store a default value of its type and also store an ordered sequence of <conditional test, alternative value> pairs. When asked for a value, the conditional value manager 208 can run through a number of conditional tests to see if any return true. If they do, the corresponding value is returned to the requester of the value. If none evaluate to true, or if there are no conditional tests, the default value is returned.

Figure 3:
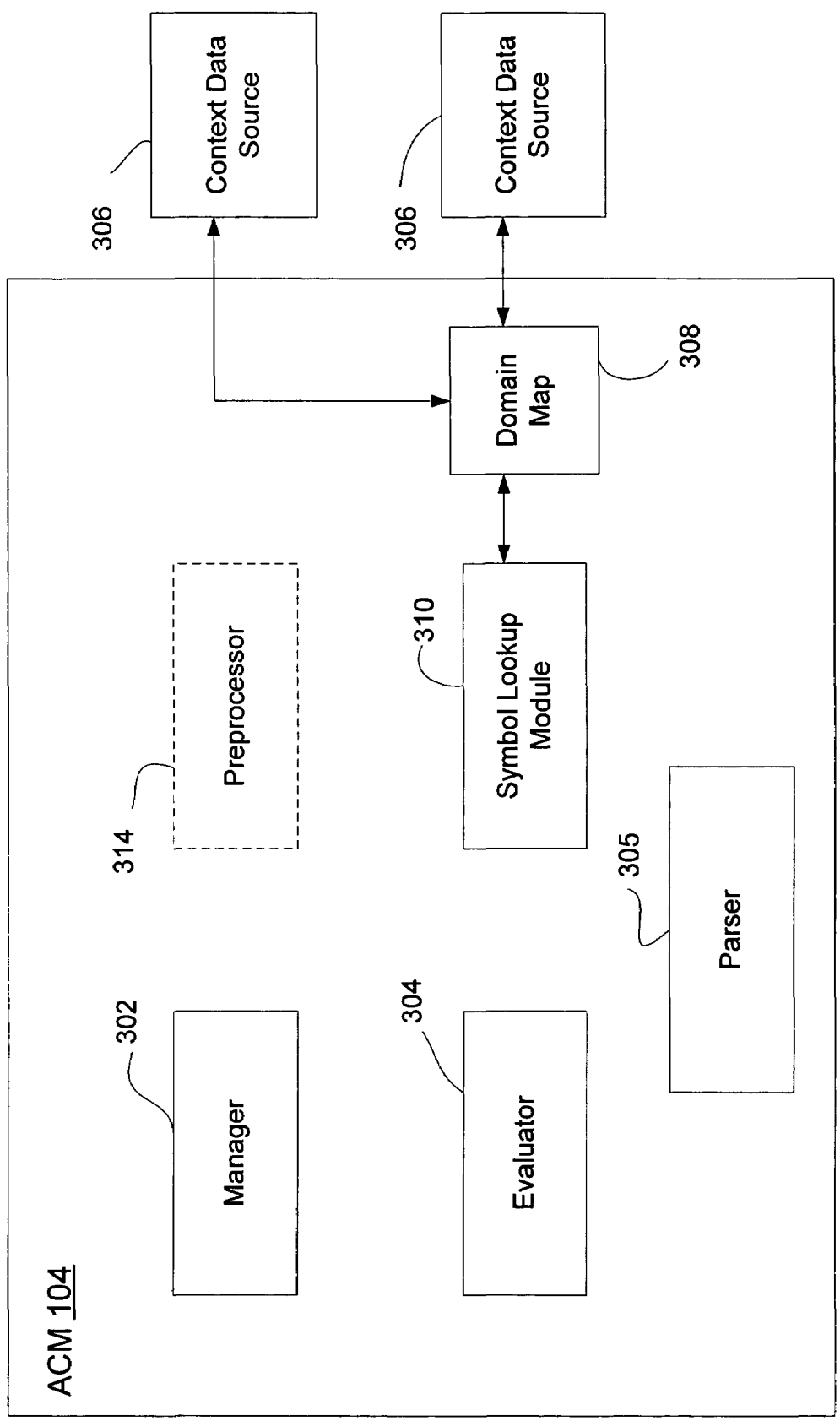
FIG. 3 is a block diagram depicting functional components within the application context manager, according to an embodiment of the present invention.

Referring now to FIG. 3, there is shown a block diagram depicting functional components of the ACM 104, according to one embodiment of the present invention. In the illustrated embodiment of the ACM 104, there are shown six components: a manager 302, an evaluator 304, an optional preprocessor 314, a parser 305, a symbol lookup module 310, and a domain map 308. Additionally, FIG. 3 depicts two context data sources 306 (though there can be one context data source, or more than two context data sources 306, in some embodiments), which are application objects that implement a context data source interface and are registered with the ACM 104 for use by it. In some embodiments of the invention, the parser 305 is external to the ACM 104, and any one or more of the other components can be external to the ACM 104, as well.

The manager 302 controls the execution of the various components of the ACM 104, and manages evaluation of expressions given to the ACM 104. In addition, the manager 302 tracks a list of context data sources 306 that are available for use in evaluating expressions, and the context data source 306 objects are tracked in the domain map 308. Thus, the manager 302 is responsible for managing the internal services of the ACM 104, and passing requests to the functional components of the ACM 104 (i.e., when registering a data source) or passing requests between the components (i.e., when passing a preprocessed output to the evaluator 304).

In some embodiments of the present invention, the ACM 104 uses a runtime object registry during startup to register itself as the global object that implements a condition evaluator interface and a context data source manager interface. The condition evaluator interface supports the condition evaluation function of the ACM 104, and the context data source manager interface supports the context data source 306 registration function of the ACM 104. As an alternative to using a runtime object registry, in some embodiments the ACM 104 might contact a server or object request broker, such as a CORBA ORB.

The parser 305 parses the rules for the ACM 104 to extract symbols for lookup and operators to be applied to the symbols in evaluating the rules. The parser 305 turns the conditional expression into an instruction "tree" for evaluation by the evaluator 304.

In some embodiments, the ACM 104 also has the ability to apply aliases, substitute expressions, macros, tokens expansions, or other approaches known in the art in order to enhance the flexibility of the system 100. In these embodiments, the ACM 104 optionally includes a preprocessor 314 that takes the expressions or rules and applies the aliases, substitute expressions, macros, token expansions, etc. to the rule before the rule is actually fed to the evaluator 304. In some embodiments, the preprocessed aliases and parse "trees" for the preprocessed aliases are stored in a map object for later use by the symbol lookup module 310. In some embodiments, the functions of the preprocessor 314 are incorporated into the parser 305 and applied concurrently during expression parsing.

The evaluator 304 uses the instruction "tree" created by the parser 305 to analyze the resultant parsed expression plus values. The evaluator 304 evaluates the "tree" and calls back to the symbol lookup module 310 to get values for symbols. The evaluator 304 ultimately resolves the expression and returns a Boolean result to the manager 302 which passes it on to the ACE 102 or other client of the ACM 104.

The symbol lookup module 310 provides symbol values to the evaluator 304 during the evaluation process. The symbol lookup module 310 can work with a domain map 308 to find a context data source 306 that publishes the requested value and then calls the corresponding context data source 306 to obtain the actual value. In some embodiments, the symbol lookup module 310 can provide named values, alias values, function execution, etc. For example, the symbol lookup module 310 can obtain a preprocessed alias (i.e., by calling an alias map object) when the evaluator 304 encounters an alias in the tree.

A context data source 306 is any object or data source that stores context data about an application and provides data to the symbol lookup 310 for use in evaluating an expression. Though FIG. 3 illustrates only two context data sources 306, in some embodiments there are numerous context data sources 306. For example, a context data source 306 may include an installed application or business logic component that provides information about the installation date or license permissions installed with that version of the application. In some embodiments, a context data source map provides a lookup mechanism for named domains to registered context data source interfaces. During startup, the context data sources 306 can call the context data source manager interface (discussed previously) and hook themselves into and/or register themselves with the manager 302. When this call is made, the context data sources 306 can also specify what "domain" they provide values for. A context data source 306 domain can be a "namespace" for values to allow for logical scoping. Assigning a namespace to named values can prevent clashes between similarly named values (e.g. Application.Level and UserModel.Level). Once the ACM 104 has registered itself as the context data source manager interface, other components can register context data sources 306 with the ACM 104. In some embodiments, when a component registers a context data source 306 interface, the interface and domain value are managed in a context data source domain map 308.

The values published by the context data sources 306 may be replaced, added to, or modified at runtime. These changes in the values provided by the context data sources 306 may result in changes to the evaluated expressions as reported to the ACE 102. These changes may also be propagated by the ACE 102 to the clients 108 resulting in a change in the application configuration reported to the clients 108. Changes in the values provided by the context data sources 306 may occur dynamically and/or at runtime and the propagation of these changes to a change in the application configuration may likewise occur dynamically and/or at runtime. Thus, in some embodiments, the invention provides for a dynamically configurable view for the application configuration based on non-static modifications in the underlying application context. For example, addition of a license key or optional executable plug-in component context data source 306 or the change in a value in a preferences context data source 306 may be propagated to a client-application menu configuration resulting in appearance and availability of additional optional features or user interface components to a user without having to restart the application.

Figure 4:
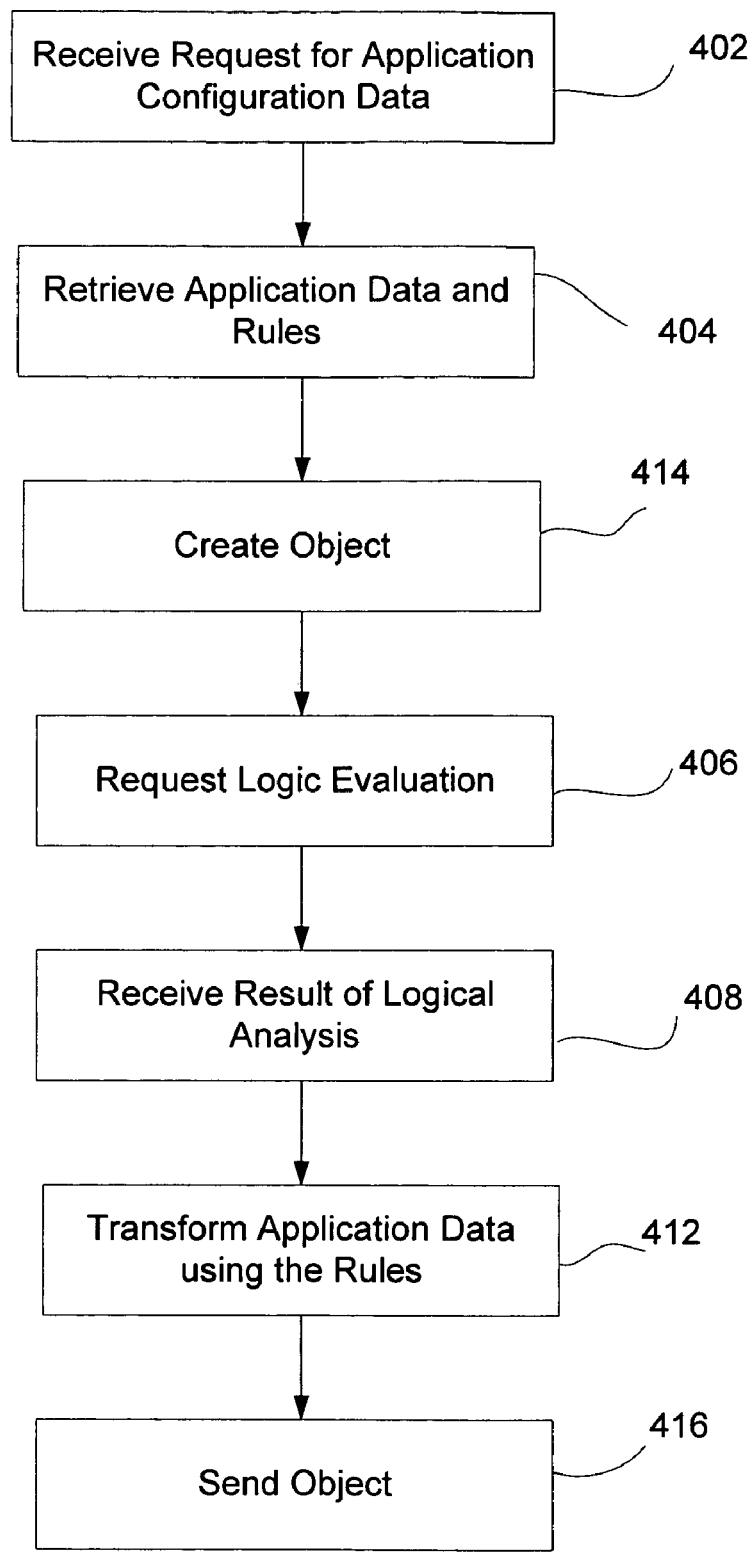
FIG. 4 is a flowchart depicting operation of the application configuration engine, according to one embodiment of the present invention.

Referring now to FIG. 4, there is shown a flowchart depicting the operation of the ACE 102, according to one embodiment of the present invention. In this depicted method, the ACE 102 receives 402 a request for application configuration data, such as a request for a named URL, named parameter, a current product version, etc. In some embodiments, the client 108 requests application configuration information from components other than the ACE 102 (e.g., the ACM 104).

The ACE 102 calls the ADR 106 to retrieve 404 raw application data and rules regarding application configuration. The ADR 106 calls back to the ACE 102 to create 414 an application object of a type "T" with an ID "X". The ACE 102 can use a prototype object of type "T" to create a new instance with ID "X." This new instance can then be returned to the ADR 106, which calls the SetXXX( ) methods on the instance to load the data into that object. The ACE 102 can keep track of these objects in a set of maps stored in the cache 204. The ACE 102 then calls the ACM 104 to request 406 any conditional logic in the rules to be evaluated. In some embodiments, the ACE 102 calls the ACM 104 concurrent with its call to the ADR 106. The ACE 102 then receives 408 the result of the logical analysis conducted by the ACM 104.

Once the ACE 102 has the evaluation of the rules, the ACE 102 combines the rules with the raw application data from the files stored in the ADR 106. The ACE 102 selects and transforms 412 the raw application data using the rules, and thus determines the appropriate response to the client 108 request. The ACE 102 then sends 416 these objects to the client 108 in response to the client's 108 request, and these objects provide the client with context-based application configuration information that can be applied for configuring the application. In some embodiments, the objects already exist, and the ACE 102 updates the existing objects for the client 108 rather than creating new objects and sending these to the client 108.

Figure 5:
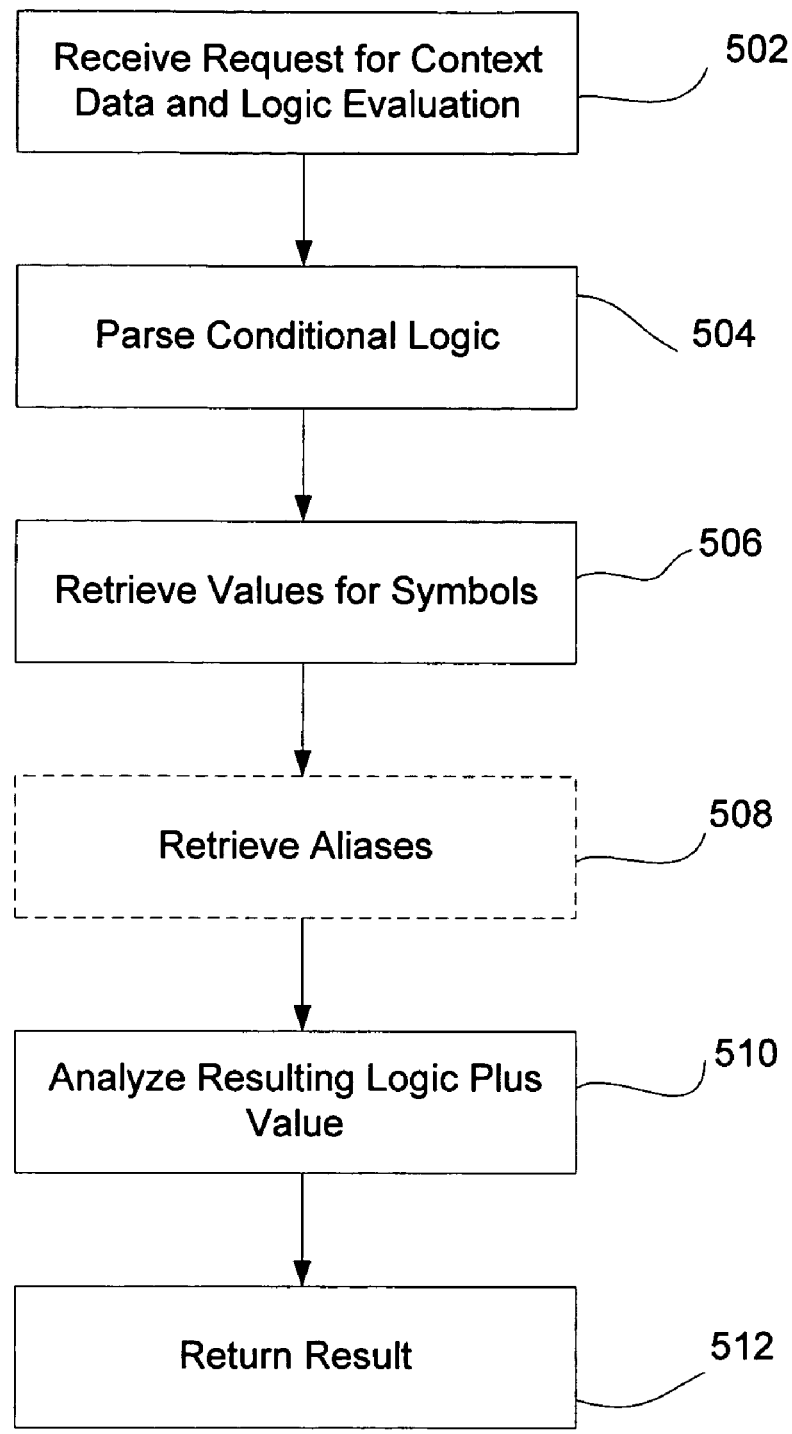
FIG. 5 is a flowchart depicting operations of the application context manager, according to one embodiment of the present invention.

Referring now to FIG. 5, there is shown a flowchart depicting the operation of the ACM 104, according to one embodiment of the present invention. The ACM 104 receives 502 a request from the ACE 102 for evaluation of logic. The ACM 104 parses 504 the expression into an instruction "tree." The ACM 104 evaluates the "tree" to determine what values are needed for symbols in the expression. The ACM 104 uses a domain map 308 to find the context data source 306 that publishes the requested value. The ACM 104 then retrieves 506 the actual values for symbols. The ACM 104 uses the resolved symbols and retrieved values in its evaluation of the conditional logic.

In some embodiments, the method includes the optional step in which the ACM 104 retrieves 508 aliases for use in resolving the expression. In some embodiments, the ACM 104 calls a map object to get preprocessed aliases when an alias is encountered in the instruction "tree." The alias values permit the ACM 104 to take the expressions or rules and replace a part or whole with aliases (or substitute expressions, macros, token expansions, etc.) during the logic resolution. The ACM 104 then analyzes 510 the resulting conditional logic plus value and returns 512 a logical result for the ACE 102.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method for configuring an application on a computer system, comprising:
    receiving a request to configure the application from a client associated with the application, wherein the computer system is external to the client, and wherein the request comprises an application context describing a state of the application at runtime;
    obtaining a rule comprising a conditional expression for configuring the application at runtime;
    parsing the rule to extract a symbol and an operator;
    converting the conditional expression into a tree comprising the symbol and the operator;
    replacing the symbol with a value from the application context using a domain map to find a context data source publishing the value;
    calculating a correct configuration for the application based on the application context by evaluating the tree after replacing the symbol;
    obtaining an application object associated with a plurality of options for configuring the application;
    selecting an option of the plurality of options based on the correct configuration for the application; and
    sending, from the computer system and in response to the request, an instance of the application object encapsulating the option to the client, wherein the application object is used to set a configuration of the application to the correct configuration.

2. The method of claim 1, further comprising:
    generating the instance of the application object using a factory design pattern; and
    generating a map to manage a location of the application object, wherein the map is associated with a type of the application object.

3. The method of claim 1, wherein the application context comprises a version of the application.

4. The method of claim 1, wherein the application context comprises access rights of a user of the application.

5. The method of claim 1, wherein the client embodies the application.

6. The method of claim 1, wherein the application object models a creation and a display of a user interface (UI) in the application.

7. The method of claim 1, wherein the plurality of options comprises application menu items available to a user of the application.

8. The method of claim 1, wherein the plurality of options comprises contents of a form accessed by the application.

9. The method of claim 1, wherein the plurality of options comprises at least one selected from a group consisting of a default list of accounts, a default list of inventory items, and a default list of customer types accessed by the application and available to a user of the application.

10. The method of claim 1, wherein the plurality of options comprises a feature of the application available to a user of the application.

11. The method of claim 1, wherein the application is used to prepare a tax return by assembling financial data from a user and performing a calculation based on the financial data.

12. A computer readable storage medium encoding computer program code to configure an application on a system, the computer program code comprising functionality to:
    receive a request to configure the application from a client associated with the application, wherein the system is external to the client, and wherein the request comprises an application context describing a state of the application at runtime;
    obtain a rule comprising a conditional expression for configuring the application at runtime;
    parse the rule to extract a symbol and an operator;
    convert the conditional expression into a tree comprising the symbol and the operator;
    replace the symbol with a value from the application context using a domain map to find a context data source publishing the value;
    calculate a correct configuration for the application based on the application context by evaluating the tree after replacing the symbol;
    obtain an application object associated with a plurality of options for configuring the application;
    select an option of the plurality of options based on the correct configuration for the application; and
    send, from the system and in response to the request, an instance of the application object encapsulating the option to the client wherein the application object is used to set a configuration of the application to the correct configuration.

13. The computer readable storage medium of claim 12, the computer program code further comprising functionality to:
    generate the instance of the application object using a factory design pattern; and
    generate a map to manage a location of the application object, wherein the map is associated with a type of the application object.

14. The computer readable storage medium of claim 12, wherein the application context comprises a version of the application.

15. The computer readable storage medium of claim 12, wherein the application context comprises access rights of a user of the application.

16. The computer readable storage medium of claim 12, wherein the client embodies the application.

17. The computer readable storage medium of claim 12, wherein the application object models an appearance of a user interface (UI) in the application.

18. The computer readable storage medium of claim 12, wherein the plurality of options comprises application menu items available to a user of the application.

19. The computer readable storage medium of claim 12, wherein the plurality of options comprises contents of a form accessed by the application.

20. The computer readable storage medium of claim 12, wherein the plurality of options comprises at least one selected from a group consisting of a default list of accounts, a default list of inventory items, and a default list of customer types accessed by the application and available to a user of the application.

21. The computer readable storage medium of claim 12, wherein the plurality of options comprises a feature of the application available to a user of the application.

22. The computer readable storage medium of claim 12, wherein the application is used to prepare a tax return by assembling financial data from a user and performing a calculation based on the financial data.

23. A system for configuring an application, comprising:
   a processor;
   an application definition repository (ADR) storing a rule comprising a conditional expression, and an application object for configuring the application, the application object being associated with a plurality of options for configuring the application during runtime;
   an application context manager (ACM) comprising symbol lookup module, operatively connected to the ADR and configured to use the processor to:
      receive a request to configure the application from a client associated with the application, wherein the ACM is external to the client, and wherein the request comprises an application context describing a state of the application at runtime;
      parse the rule to extract a symbol and an operator;
      convert the conditional expression into a tree comprising the symbol and the operator;
      replace the symbol with a value from the application context, wherein the symbol lookup module identifies the value using a domain map to find a context data source publishing the value; and
      evaluate the tree to generate a result; and
   an application configuration engine (ACE) operatively connected to the ADR and the ACM, wherein the ACE is configured to use the processor to calculate a correct configuration for the application based on the result, select an option of the plurality of options based on the correct configuration, and send an instance of the application object encapsulating the option to the client in response to the request,
   wherein the application object is used by the client to set a configuration of the application to the correct configuration.

24. The system of claim 23, wherein the client embodies the application.

25. The system of claim 23, wherein the application is used to prepare a tax return by assembling financial data from a user and performing a calculation based on the financial data.

26. The system of claim 23, wherein the ACE comprises:
   an engine for creating the instance of the application object;
   an application object base operatively connected to the engine for accessing property information of the instance of the application object; and
   a cache operatively connected to the engine, wherein the cache comprises a map to manage a location of the instance of the application object.

27. The system of claim 23, wherein the ACE is a dynamically linked library (DLL).

28. The system of claim 23, wherein the plurality of options comprises menu items available to a user of the application.

29. The system of claim 23, wherein the application context comprises at least one selected from a group consisting of a version of the application and access rights of a user of the application.

* * * * *